March 13, 1956   G. W. CRABTREE   2,738,036
SHOCK ABSORBER WITH FLUID FILLING MEANS
Filed Jan. 25, 1950   2 Sheets-Sheet 1

INVENTOR.
GEORGE W. CRABTREE
BY
ATT.

March 13, 1956  G. W. CRABTREE  2,738,036
SHOCK ABSORBER WITH FLUID FILLING MEANS
Filed Jan. 25, 1950  2 Sheets-Sheet 2

INVENTOR.
GEORGE W. CRABTREE
BY
ATT.

United States Patent Office 2,738,036
Patented Mar. 13, 1956

2,738,036

SHOCK ABSORBER WITH FLUID FILLING MEANS

George W. Crabtree, Cleveland Heights, Ohio

Application January 25, 1950, Serial No. 140,409

2 Claims. (Cl. 188—88)

This invention relates in general to double-acting hydraulic spring controlling units of the directly actuated type which check and retard movements of vehicle springs under compression and their reflex actions under rebound by forcible displacement of liquid from one end of a working chamber to its other end and vice versa and, which for high efficiency include means automatically effecting replacing of any liquid leaked from the working chamber to prevent forming of air and vapor bubbles in such chamber. Hydraulic spring controlling units of this type displace their liquid with shock absorbing effects from one end of the working chamber to its other end, or vice versa, by forcing such liquid through restricted passage means of definite cross section, an arrangement which prohibits continuous predetermined control of the springs. The size of the definite cross section of the restricted passage means is generally determined by taking the best suitable cross section after evaluation of all possible conditions present in springs when under compression and reflex stresses.

In my copending application Ser. No. 133,416, filed December 16, 1949, and now Patent No. 2,649,938, issued Aug. 25, 1953, I have disclosed hydraulic spring controlling units with passage means constructed to differentially change the liquid passage area and permit predetermined, fully-controlled differential checking action of the units; however, spring-controlling units of the type disclosed therein embody a cylinder with two axially-aligned, individual working chambers and a double piston member, the spaced pistons of which are arranged in said working chambers and connected with each other by a piston rod slidably extended through a disk-like stationary member separating the working chambers from each other.

The general object of this invention is the provision of a hydraulic spring controlling unit with a single cylinder and piston member and passage means constructed to differentially change the liquid passage area for predetermined, fully-controlled, differential checking action of the unit, the liquid in spring controlling actions being displaced from one end of the cylinder to its other end through such passage means.

Another object of the invention is the provision of a hydraulic spring-controlling unit of the single cylinder piston type which includes liquid flow controlling passage means formed by channels in the inner wall of the cylinder, which channels differentially vary in cross section to provide in cooperation with the piston liquid passage means differentially changing their cross section when in spring-controlling operations the piston is shifted in the cylinder.

A further object of the invention is the provision of a hydraulic spring-controlling unit of the single cylinder-piston type which includes liquid-flow-controlling passage means formed by a bore in the piston and an axially non-shiftably supported rod member of differentially varying cross section, which rod member extends through said bore and effects differential change of the size of the liquid-flow-controlling passage means when in spring-controlling operations the piston is shifted in the cylinder.

Additional objects and novel features of construction, combination and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

Figure 1:
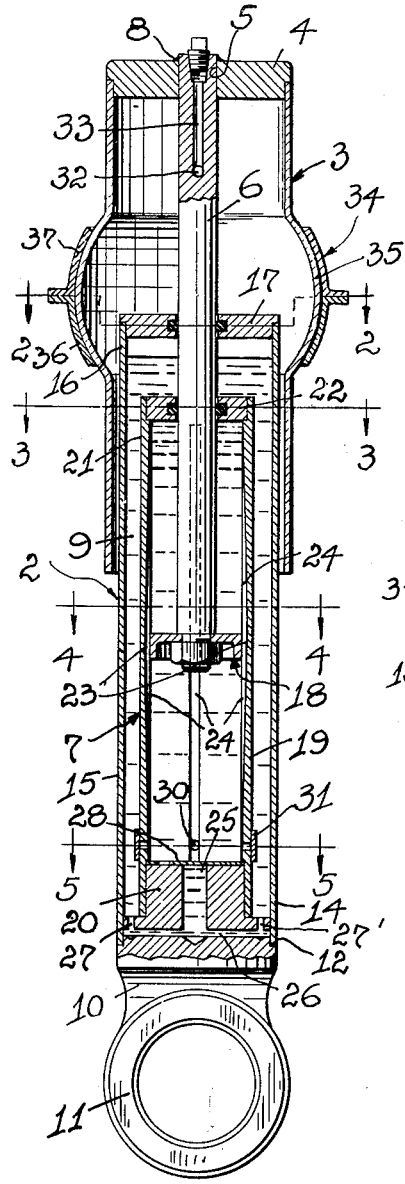
Fig. 1 is a longitudinal sectional view partly in elevation, showing a directly-actuated, double-action, single-cylinder piston type, hydraulic spring-controlling unit embodying the invention.
Figure 2:
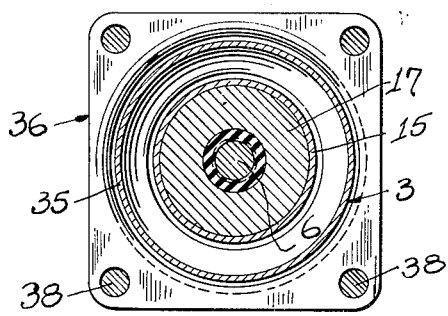
Fig. 2 is a cross-sectional view taken on line 2—2 of Fig. 1.
Figures 3, 6:
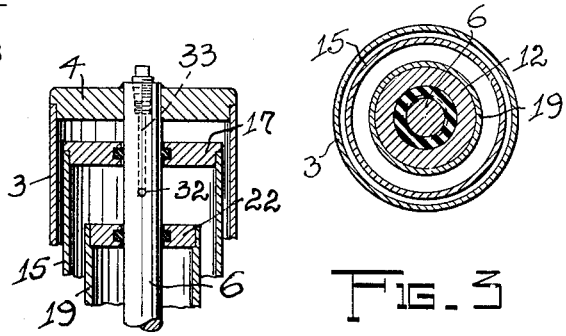
Fig. 3 is a cross-sectional view taken on line 3—3 of Fig. 1.
Fig. 6 is a fragmentary sectional view showing the relative position of the parts when the unit is to be filled with liquid.
Figure 4:
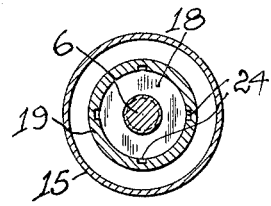
Fig. 4 is a cross-sectional view taken on line 4—4 of Fig. 1.
Figure 5:
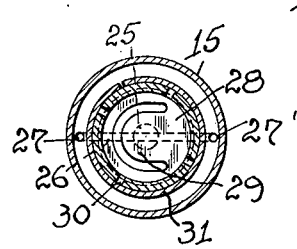
Fig. 5 is a cross-sectional view taken on line 5—5 of Fig. 1.
Figure 7:
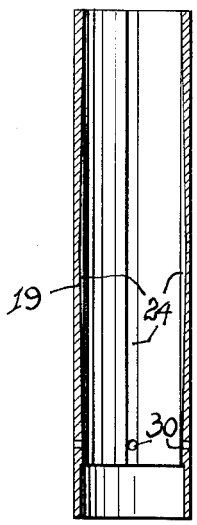
Fig. 7 is a longitudinal sectional view through the cylinder of the unit shown in Fig. 1.
Figure 8:
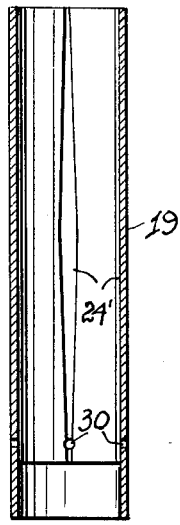
Fig. 8 is a longitudinal sectional view through a modified form of a cylinder for the unit shown in Fig. 1.

Referring now more in detail to the exemplified form of the structure shown in Figs. 1 through 8 of the drawings, reference numeral 2 denotes a double-acting hydraulic spring-controlling unit of the single cylinder piston type. This unit includes a tubular shielding member 3 closed at its upper end by a top plate 4 which mounts in a central bore 5 the end of a piston rod 6 of a cylinder piston device 7, which piston rod is rigidly secured to said plate by welding at 8. Cylinder piston device 7 is arranged within a tubular fluid storage chamber 9 embodying a base member 10 provided with a supporting or coupling ring 11, which base member mounts on a circumferential shoulder 12 the lower end 14 of a cylindrical tube 15 forming the tubular fluid storage chamber 9. Cylindrical tube 15 is closed at its upper end 16 by a ring-shaped plate 17 having fluid-tightly slidably extended therethrough the piston rod 6 forming a part of the cylinder piston device 7. The lower end of piston rod 6 mounts a piston 18 shiftably arranged in a cylinder 19 concentrically arranged within cylindrical tube 15, which cylinder has its lower end sleeved on and fluid-tightly secured to a reduced cylindrical extension 20 of base member 10. Cylinder 19 is closed at its upper end 21 by a ring-shaped plate 22 having fluid-tightly slidably extended therethrough the piston rod 6 to permit in shock-absorbing procedures reciprocating movements of piston 18 in cylinder 19 for forcibly shifting liquid from one end of said cylinder through passage means 23 to the other end of such cylinder and vice versa.

Passage means 23 are constructed to effect differential changes in the cross section of its liquid passing area and afford predeterminable differentiating choking actions on the liquid when forced by piston 18 from one end of cylinder 19 to its other end. These passage means are formed by elongated recesses or grooves 24 in the inner wall of cylinder 19. The grooves 24 extend substantially lengthwise of the cylinder and differentially increase or decrease in depth (see grooves 24 in Fig. 7) or width (see grooves 24' in Fig. 8) to automatically change the cross section of the liquid passing area of passage means 23 when, in shock absorbing operations, piston 18 travels longitudinally with respect to the wall of cylinder 19 or vice versa.

Proper operation of the thus constructed spring-controlling unit is made possible by continuous automatic refill of liquid leaked out of the spring-controlling unit. This is effected by a valve-controlled central passage 25 in the reduced cylindrical extension 20 of base member 10, which passage through a cross bore 26 and vertical bores 27, 27' communicates with tubular fluid storage chamber 9. The passage 25 is controlled by a disk valve member 28 with a yielding central tongue 29 covering said passage. This valve member permits entering of liquid from fluid storage chamber 9 into cylinder 19 when piston 18 travels upwardly, such movement reducing the pressure in the lower part of cylinder 19 and preventing liquid from being fed back into the fluid storage chamber when the piston travels downwardly. The liquid in fluid storage chamber 9 is under atmospheric pressure, therefore, liquid leaked from cylinder piston device 7 and entering storage chamber 9 cannot be lost.

To avoid excessive choking action and braking of the hydraulic spring-controlling unit under excessive compression, cylinder 19 includes a plurality of relief passages 30 which are closed by a split ring 31 of sufficient stiffness to avoid escape of liquid from the lower portion of the cylinder when the unit is working under normal conditions.

Hydraulic spring-controlling unit 2 may be filled or refilled with liquid when the unit is shifted to its compressed position (see Fig. 6) in which cross bore 32 of an axial bore 33 in piston rod 6 communicates with liquid storage chamber 9.

The hydraulic spring controlling unit is secured to the frame of an automobile by coupling ring 11 and a bracket member 34 universally shiftably mounted on a spherical bulge 35 on tubular shielding member 3. This bracket member embodies two symmetrically constructed portions 36 and 37 which are secured to each other by bolts 38.

When attached to the frame and axle of an automobile, relative movements between frame and axle effect shifting of piston 18 in cylinder 19. On the downward stroke piston 18 forces liquid from the lower end of cylinder 19 through the passage means 23 which by the movement of the piston with respect to the cylinder differentially changes the cross section of its liquid-passing area into the upper end of such cylinder. In this action the choking action of the passage means changes in accordance with its varying liquid-carrying cross area, which is fully controlled by the varying width and depth of the grooves 24 in cylinder 19. On the upward stroke, piston 18 effects in a similar manner forcible displacement of liquid from the upper end of cylinder 19 into its lower end, as will readily be understood from inspection of Fig. 1. The choking action of passage means 23 in this latter case is, however, directly opposite to the choking action of the passage means 23 on the downward movement of the piston due to the fact that piston 18 travels in the opposite direction.

The modified hydraulic spring-controlling unit 39, shown in Figs. 9 through 13 of the drawings, is substantially identically constructed with the exception of the passage means 40 effecting communication of the upper and lower cylinder end portions with each other. These passage means are formed by a through passage 41 in the piston 42 of the cylinder piston member and a metering rod assembly 43 embodying a metering rod 44 of differentially varying cross section, mounting at its opposite ends rigidly connected therewith plate member 45 and 46 sized to substantially fit cylinder 19. The upper plate 45 includes a bore 47 slidably fitting the piston rod to permit proper shifting of piston 42 in cylinder 48. The metering rod 44 extends through the through passage 41 in piston 42 and by its differentiating cross section affords a simple means of differentially varying the cross section of the liquid-passing area of passage means 40 when piston 42 is shifted longitudinally with respect to the axially, non-shiftably arranged metering rod assembly 43.

Figure 9:
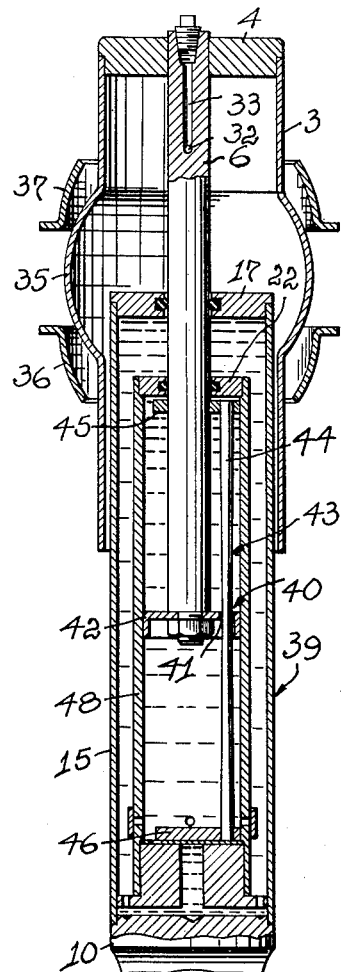
Fig. 9 is a longitudinal sectional view, partly in elevation, through a somewhat modified form of the spring-controlling unit shown in Fig. 1.
Figures 10, 12:
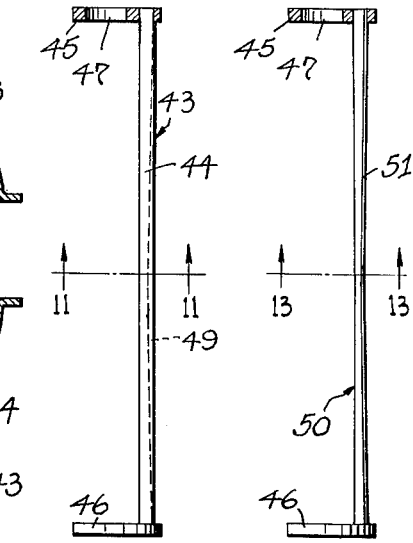
Fig. 10 is a side view partly in section of the controlling rod assembly for the through passage in the piston of the unit shown in Fig. 9.
Fig. 12 is a side view partly in section of a modified form of the controlling rod assembly for the through passage in the piston of the unit shown in Fig. 9.
Figure 13:
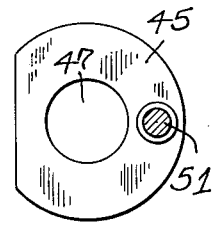
Fig. 13 is a cross-sectional view taken on line 13—13 of Fig. 12.
Figure 11:
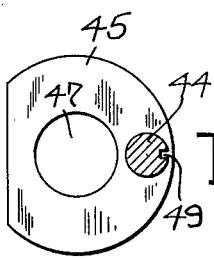
Fig. 11 is a cross-sectional view taken on line 11—11 of Fig. 10.

In the metering rod assembly 43, shown in Figs. 9, 10 and 11, metering rod 44 includes a groove 49 which differentially varies in depth, whereas in metering assembly 50 (see Figs. 12 and 13) metering pin 51 is differentially varying in diameter to provide these assemblies with metering pins adapted to effect differentiation in the choking action of the passage means 40 when piston 42 is shifted in cylinder 48.

Having thus described my invention, what I claim is:

1. In a hydraulic spring controlling unit, an elongated rigid cylindrically shaped fluid storage chamber having its top end closed by an axially perforated end wall, and a cylinder piston device of smaller cross section than said fluid storage chamber arranged fully within said fluid storage chamber in spaced relation from its top and peripheral walls and in valved communication therewith only at its bottom portion, said cylinder piston device including a tubular cylinder having its top end closed by an axially perforated end wall, piston means in said tubular cylinder including a piston rod fluid-tightly slidably extended through the spaced top end walls of said cylinder and said fluid storage chamber, and a filling passage in the extended end portion of said piston rod arranged lengthwise thereof, said filling passage including an outlet laterally extended therefrom and located to extend into the fluid storage chamber above the top end wall of the cylinder only when the piston of the piston means has been shifted to the bottom end of the tubular cylinder.

2. A hydraulic spring controlling unit comprising a base, a first rigid tubular member closed at its top end by an axially perforated end wall and mounted at the bottom end on said base, a second rigid tubular member shorter in length and smaller in diameter than said first tubular member, said second tubular member being mounted on said base and in axial alignment therewith, and said second tubular member being closed at the top end by an axially perforated end wall spaced from the top end wall of the first tubular member, valved passage means in said base connecting the bottom portions of said tubular members with each other, and piston means in said second tubular member including a piston rod fluid-tightly, shiftably extended through the perforations in the top end walls of said two tubular members, said piston rod having arranged in its extended portion a filling passage extending lengthwise thereof and terminating in a lateral outlet in the peripheral piston rod wall, said outlet arranged to be positioned within the first tubular member above the top end wall of the second tubular member only when the said piston means has been shifted to the bottom end of said second tubular member.

(References on following page)

References Cited in the file of this patent

UNITED STATES PATENTS

| | | | |
|---|---|---|---|
| 913,349 | Batault | Feb. 23, | 1909 |
| 1,037,052 | Rennie | Aug. 27, | 1912 |
| 1,141,310 | Bradburn | June 1, | 1915 |
| 1,445,414 | Schuessler | Feb. 13, | 1923 |
| 2,048,285 | Padgett | July 21, | 1936 |
| 2,064,527 | Ericsson | Dec. 15, | 1936 |
| 2,163,254 | Binder et al. | June 20, | 1939 |
| 2,163,255 | Binder et al. | June 20, | 1939 |
| 2,297,400 | Friedrich | Sept. 29, | 1942 |
| 2,316,924 | Whisler | Apr. 20, | 1943 |

FOREIGN PATENTS

| | | | |
|---|---|---|---|
| 400,134 | Great Britain | Oct. 19, | 1933 |